United States Patent

[11] 3,573,859

| [72] | Inventor | George W. Sederberg<br>Highland Heights, Ky. |
| --- | --- | --- |
| [21] | Appl. No. | 813,519 |
| [22] | Filed | Apr. 4, 1969<br>Division of Ser. No. 636,965<br>May 8, 1967, abandoned |
| [45] | Patented | Apr. 6, 1971 |
| [73] | Assignee | Cincinnatti Milacron Inc.<br>Cincinnati, Ohio |

[54] METHOD FOR CUTTING SHARP ANGLES IN MATERIAL
9 Claims, 32 Drawing Figs.

[52] U.S. Cl. ........................... 83/34,
83/427, 83/428, 83/433, 83/925
[51] Int. Cl. ........................... B26d 1/00
[50] Field of Search ........................... 83/34, 29,
39, 49, 925 (CC), 215, 216, 217, 556, 647, 427,
428, 561, 563, 433

[56] References Cited
UNITED STATES PATENTS

| 1,172,058 | 2/1916 | Scheyer .................. | 83/561X |
| --- | --- | --- | --- |
| 3,184,158 | 5/1965 | Beeren et al. ........... | 83/215X |
| 3,245,295 | 4/1966 | Mueller .................. | 83/428X |
| 3,304,820 | 2/1967 | Mueller et al. ......... | 83/428X |

*Primary Examiner*—James M. Meister
*Attorney*—Frank C. Leach, Jr.

ABSTRACT: A material cutting machine having a pair of endless bands, which are driven in unison, to advance material thereon longitudinally relative to a reciprocating cutting blade, which is supported by a fixed bridge of the cutting machine. The cutting blade is mounted for transverse movement through a transverse passage, which is formed between the endless bands supporting the material, and also is rotatable about a vertical axis. The movement of the endless bands and the transverse and rotational movements of the cutting blade are controlled by a numerical control apparatus. The cutting blade is formed with cutting surfaces on its leading edge and its lower edge, which connects the bottom ends of the leading and trailing edges.

METHOD FOR CUTTING SHARP ANGLES IN MATERIAL

This application is a division of application Ser. No. 636,965, filed May 8, 1967, now abandoned.

Material cutting machines have previously been suggested in which there is universal movement between the material, which is being cut, and the cutting means whereby there is relative longitudinal and transverse movement between the material and the cutting means. One previously suggested cutting machine has utilized an endless band as the cutting means. While this endless band is satisfactory when sharp angles are not desired to be cut in material, this endless band is not capable of producing sharp angles without a waste of material. The endless band can cut at a sharp angle through looping the cutting blade whereby the cutting blade cuts the material beyond the point at which it is desired to form the sharp angle and then loops around to the point at which the sharp angle is to be formed so that the cutting blade is now headed in the new direction.

This looping of the cutting blade in order to provide the sharp angle not only wastes material but also may prevent the formation of certain desired patterns in the material. The present invention is an improvement over this previously suggested material cutting machine since it utilizes a cutting blade in which sharp angles may be formed between the cuts in the material without any waste of material. This also permits the formation of patterns in the adjacent portions of the material since the cutting blade does not cut the material except along the desired cut.

Another type of previously suggested material cutting machine utilized a barbed wire. While this barbed wire, which has cutting surfaces around its entire periphery, was capable of cutting sharp angles in the material, the barbed wire had to be relatively thin to permit cutting in any direction, and this thinness resulted in the cutting blade having a short life. While the material cutting machine using the barbed wire as the cutting blade was capable of cutting sharp corners without waste of material so that the problem of wasting material when using the material cutting machine having the endless band as the cutting blade was eliminated, the short life of the barbed wire negated its desirable feature of being able to cut sharp angles therewith.

The present invention is an improvement over the material cutting machine using a barbed wire as the cutting blade by utilizing a cutting blade having a relatively long life in comparison with the barbed wire as the cutting blade. Thus, the material cutting machine of the present invention not only eliminates the waste of material but also has the attribute of a relatively long life. Accordingly, the cutting machine of the present invention incorporates the good features of both the endless band and the barbed wire without the disadvantage of either.

A further previously suggested material cutting machine utilized an oscillating knife. However, this knife is not capable of cutting sharp angles in a fabric because the cutting knife may be turned relative to the material only while in engagement with the material. Thus, if the fabric is relatively heavy and a plurality of layers of material is being cut, the oscillating cutting knife cannot be turned at any sharp angle. Furthermore, due to the resistance of the material, efforts to turn the oscillating knife at any sharp angle would substantially reduce the life of the knife.

The present invention satisfactorily overcomes these problems by utilizing a cutting blade in which sharp angles may be formed between the cuts in the material without any damage to the cutting blade or waste of material by turning the cutting blade while it is not engaged with the material. Thus, the disadvantages of the prior cutting machine in which the knife has a relatively short life and sharp cutting angles may not be formed in the material are eliminated.

An object of this invention is to provide a method for cutting material at any sharp angle relative to the previous cut in the material without wasting material.

Other objects of this invention will be readily perceived from the following description, claims, and drawings.

This invention relates to a method for cutting sharp angles in material with a reciprocating cutting blade having cutting surfaces on both its leading edge and an edge connecting the ends of its leading and trailing edges remote from its reciprocating means in which relative longitudinal and transverse movement between the material and the cutting blade may occur. The method comprises positioning the material in a plane substantially perpendicular to the reciprocating plane of the cutting blade and removing the cutting blade from cutting engagement with the material. Then, the cutting blade is rotated to position its leading edge at the desired angle of a new cut relative to the previous cut in the material. Next, the cutting blade is moved relative to the cut in the material to dispose the cutting blade so that the cutting surface of its connecting edge will form a continuation of the cut of the material. Thereafter, the cutting blade is returned into cutting engagement with the material.

The attached drawings illustrate preferred embodiments of the invention, in which:

FIG. 9 is a sectional view of a portion of a further modification of the cutting blade of the present invention;

Figures 1, 2, 3, 4, 5, 6, 7, 8:
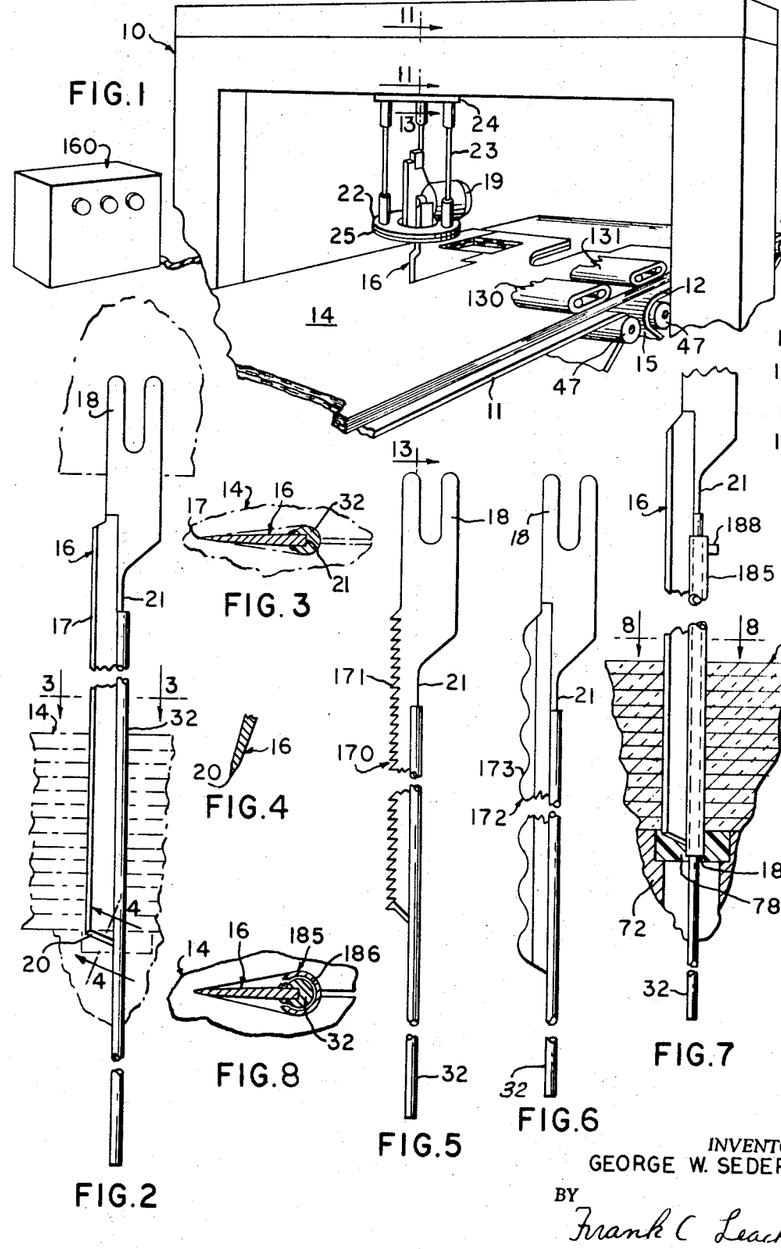
FIG. 1 is a perspective view of a portion of the material cutting machine of the present invention with some parts omitted for clarity purposes.
FIG. 2 is a side elevational view of a cutting blade of the present invention and illustrating the cutting blade in cutting engagement with material to be cut.
FIG. 3 is a sectional view of the cutting blade and taken along line 3–3 of FIG. 2.
FIG. 4 is a sectional view of a connecting edge of the cutting blade and taken along line 4–4 of FIG. 2.
FIG. 5 is a side elevational view of another form of the cutting blade of the present invention.
FIG. 6 is a side elevational view of still another embodiment of the cutting blade of the present invention.
FIG. 7 is a side elevational view, similar to FIG. 2, showing a modified support structure for the cutting blade.
FIG. 8 is a sectional view of the blade structure of FIG. 7 and taken along line 8–8 of FIG. 7.

Referring to the drawings and particularly FIG. 1, there is shown a cutting machine for carrying out the method of the present invention. The cutting machine includes stationary support means such as a bridge 10. A pair of endless bands or belts 11 and 12 is adapted to support material 14 thereon.

The endless bands 11 and 12, which are flexible and formed of any suitable material, are adapted to be driven in unison to move the material 14 thereon in a longitudinal direction and relative to the bridge 10. The endless bands 11 and 12 are spaced from each other to form a transverse passage or throat 15 therebetween for reception of a cutting blade 16.

As shown in FIGS. 2 and 3, the cutting blade 16 has its leading edge 17 sharpened to a point to form a cutting surface along its entire length. The cutting blade 16 has its end 18 attached to a motor 19, which causes reciprocation of the cutting blade 16 with respect to the material 14 supported on the endless bands 11 and 12 to cut the material 14. The end 18 of the cutting blade 16 is connected to the shaft of the motor 19 through suitable means (not shown) such as a slider secured to the end 18 of the cutting blade 16, a crank wheel on the shaft of the motor 19, and a connecting rod between the crank wheel and the slider.

The cutting blade 16 has an edge 20 connecting the bottom end of the leading edge 17 with the bottom end of trailing edge 21. The edge 20 is sharpened to a point along its entire length (see FIG. 4). Thus, the cutting blade 16 has both the leading edge 17 and the connecting edge 20 sharpened to provide cutting surfaces whereby cutting of the material 14 occurs when the connecting edge 20 is moved into engagement with the material 14.

The motor 19 is fixedly secured to a vertically movable plate or disc 22, which functions as a carriage, for support thereby. The plate 22 is slidably supported on rods 23, which extend between an upper plate or disc 24 and a lower plate or disc 25 and are permanently secured to both of the plates 24 and 25.

Each of the rods 23 is permanently secured to the plate 24 through being pinned to a bushing 26 (see FIG. 13), which is welded to the plate 24. Each of the rods 23 is permanently secured to the plate 25 by a pin. Ball bearing bushings 27, which surround the rods 23 and are secured to the plate 22 by suitable means such as brazing, for example, prevent shaking or vibration of the plate 22 during any movement of the plate 22 away from the lower plate 25.

Figure 11:
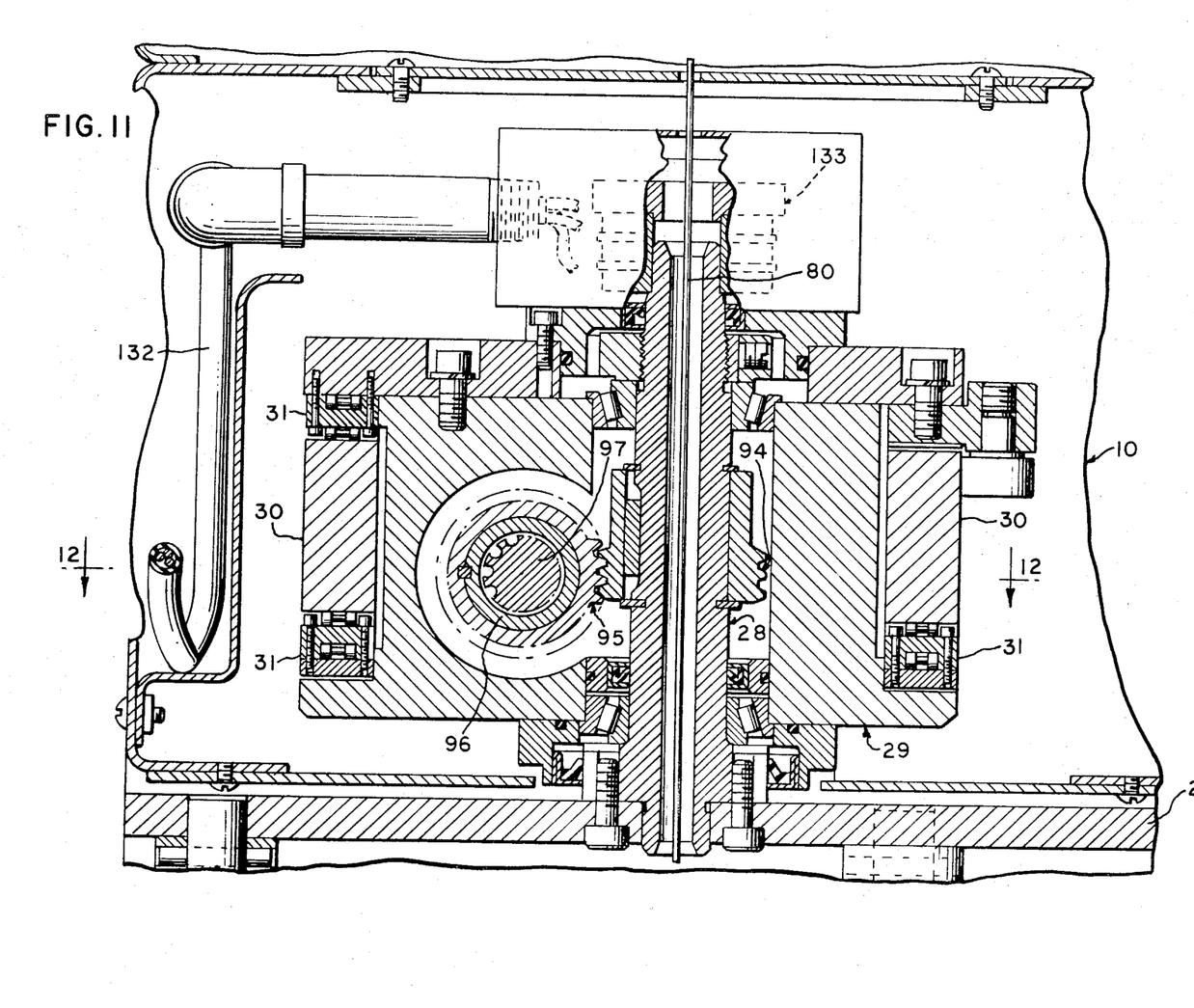
FIG. 11 is a vertical sectional view of a portion of the upper support structure for the cutting blade and taken along line 11–11 of FIG. 1.

As shown in FIG. 11, the upper plate 24 is fixedly secured to a shaft 28, which is rotatably carried by an upper saddle 29. The upper saddle 29 is slidably supported on a pair of horizontally disposed and transversely extending guide rails 30, which are supported and carried by the bridge 10. Accordingly, movement of the upper saddle 29 along the guide rails 30, which are substantially parallel to the transverse passage 15, will cause movement of the cutting blade 16 through the transverse passage or throat 15, which is formed between the endless bands 11 and 12.

The upper saddle 29 carries recirculating roller contact bearings 31 that ride on the surfaces of the rails 30 to permit the upper saddle 29 to slide on the rails 30. One suitable example of the bearings 31 is the bearing sold under the trademark TACH-O-WAY by Scully-Jones.

As shown in FIGS. 2 and 3, the trailing edge 21 of the cutting blade 16 has a stiffening rod 32 fixedly secured thereto by an epoxy such as a low temperature curing resin cement that will not melt at the cutting temperature, for example, and extending downwardly beneath the connecting edge 20 of the blade 16. The rod 32 extends through a bushing 33 (see FIGS. 18 and 19), which is fixedly supported within a hollow cylindrical member 34.

As shown in FIG. 3, the stiffening rod 32 has a diameter substantially greater than the thickness of the cutting blade 16. Thus, in addition to serving as a guide to maintain the cutting blade 16 in its reciprocating plane, the stiffening rod 32 also serves to space the material 14 from the sides of the cutting blade 16. This reduces the area of the cutting blade 16, which is in reciprocating engagement with the material 14 being cut so as to reduce the heat created in the material 14 by the reciprocation of the cutting blade 16.

This reduction in the friction between the cutting blade 16 and the material 14 is sufficient to reduce the temperature created in the material 14 so that certain types of synthetic materials, which tend to fuse at relatively low melting temperatures, are not heated to this temperature as would be the situation if the stiffening rod 32 were not employed. While the stiffening rod 32 creates friction with the material 14 since it is in reciprocating engagement with the material 14 during reciprocation of the cutting blade 16, the area of contact is much smaller. Thus, the heat generated in the material 14 is sufficiently low so that there is no possibility of most materials fusing.

The hollow cylindrical member 34 is rotatably supported by a lower saddle 35 (see FIG. 10), which is adapted to slide along lower guide rails 36 (one shown in FIG. 10 and both shown in FIG. 20) of the bridge 10 through recirculating roller contact bearings, which are the same as the bearings 31. The lower guide rails 36 are disposed substantially parallel to the upper guide rails 30. Accordingly, the upper saddle 29 and the lower saddle 35 may be moved parallel to each other in a transverse direction relative to the endless bands 11 and 12.

Figure 10:
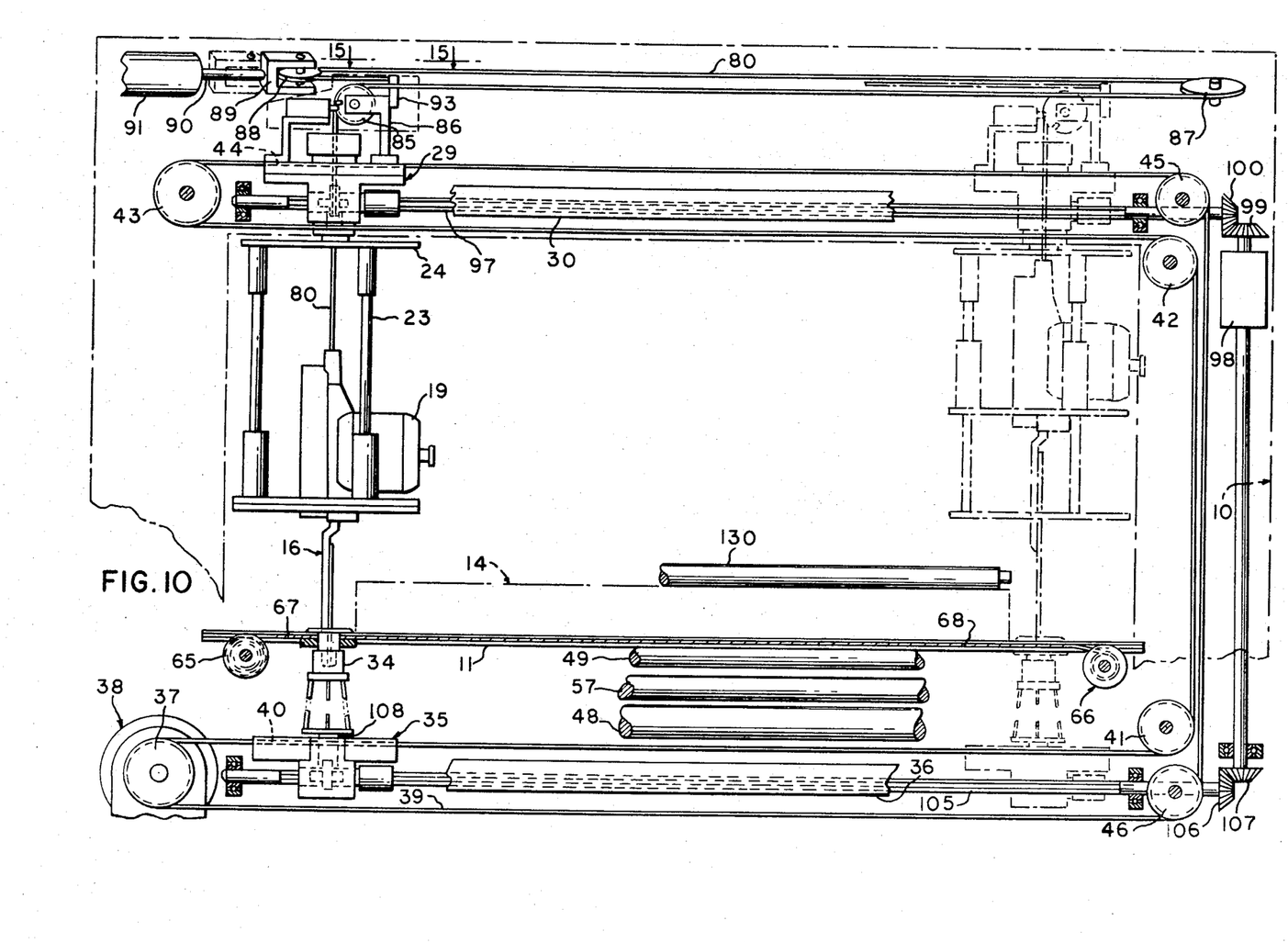
FIG. 10 is an elevational view, partly in section, of the cutting blade support structure and the mechanisms for lifting the cutting blade from cutting engagement with the material, moving the cutting blade transversely, and rotating the cutting blade.

An apparatus for moving the upper saddle 29 and the lower saddle 35 so that the cutting blade 16 traverses the transverse passage or throat 15 is shown in FIG. 10. The apparatus includes a drum 37, which is driven by a reversible motor 38. A continuous cable 39 has its ends attached to the drum 37 and is wound around the drum 37 by being disposed in helical grooves therein.

The cable 39 extends from the drum 37 through a longitudinal slot in the lower saddle 35 and is fixedly attached thereto at 40. After leaving the lower saddle 35, the cable 39 passes around a pulley 41, which is rotatably mounted on the bridge 10.

The cable 39 extends upwardly within one of the hollow support standards of the bridge 10 and passes around a pulley 42, which is rotatably mounted on the bridge 10. The cable 39 then passes beneath the upper saddle 29 and around a pulley 43, which is rotatably mounted on the bridge 10.

The cable 39 passes through a longitudinal slot in the upper saddle 29 and is fixedly secured to the upper saddle 29 at 44. The cable 39 next extends around a pulley 45, which is rotatably mounted on the bridge 10 above the pulley 42. From the pulley 45, the cable 39 extends downwardly within the hollow support standard of the bridge 10 through which it extended upwardly. The cable 39 then passes around a pulley 46, which is rotatably mounted on the bridge 10 beneath the pulley 41, and returns to the drum 37.

Accordingly, energization of the motor 38, which is preferably hydraulic, causes rotation of the drum 37 to move the upper saddle 29 and the lower saddle 35 together along the upper guide rails 30 and the lower guide rails 36, respectively, whereby the cutting blade 16 traverses the transverse passage or throat 15 to cut the material 14, which is supported on the endless bands 11 and 12. In order to move the cutting blade 16 from the solid line position of FIG. 10 to the phantom line position, the drum 37 is rotated clockwise. This winds the lower part of the cable 39 on the drum 37 and unwinds the upper part of the cable 39.

Each of the endless bands 11 and 12 is received over a pair of horizontally spaced guide rollers 47 and 48 with the rollers 47 for the bands 11 and 12 being disposed adjacent the transverse passage or throat 15. A plurality of horizontally spaced support rollers 49 (one shown for the band 11 in FIGS. 10 and 21) is supported for rotation between parallel, side plates or rails 50 of the table structure and is adapted to support the endless band 11.

Figure 21:
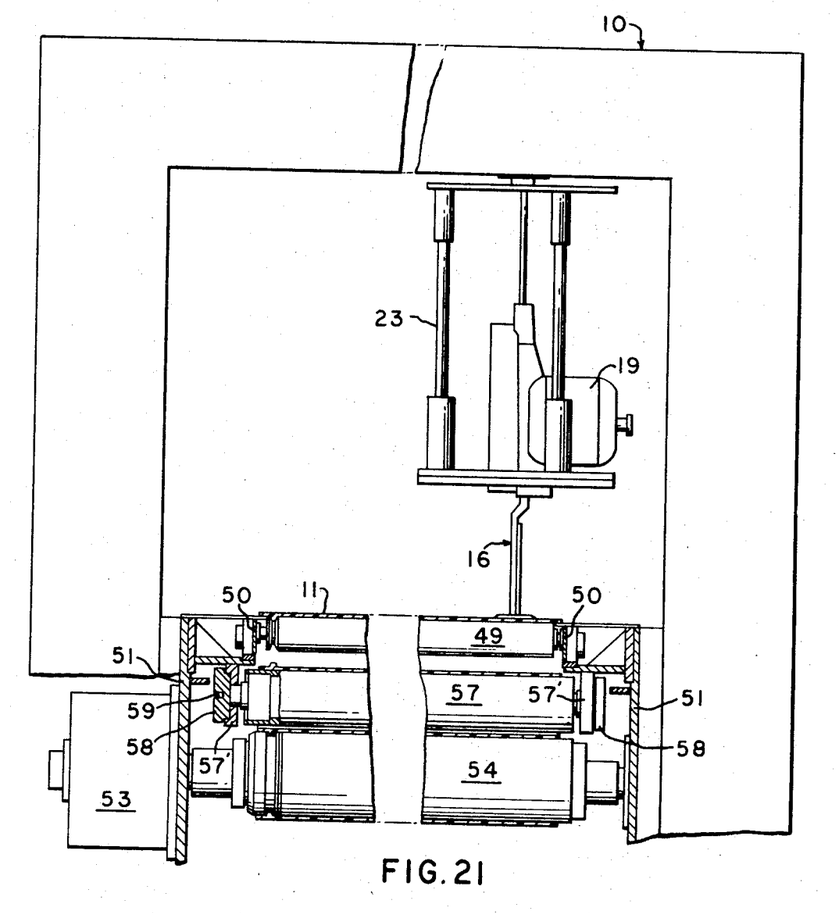
FIG. 21 is an elevational view, partly in section, showing the relationship of various rollers for one of the endless support bands and the driving connection thereto.

The rails 50 are supported by a boxlike structure, which also supports the bridge 10 and forms part of the table structure. The boxlike structure supports a pair of side plates 51, which are disposed parallel to the rails 50 as shown in FIG. 21.

Figure 22:
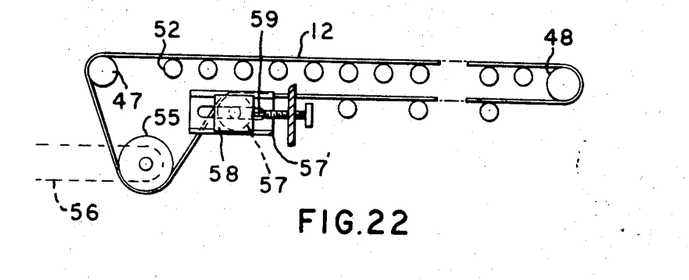
FIG. 22 is a schematic side elevational view showing the roller arrangement for one of the endless bands on which the material to be cut is supported.

The endless band 12 is similarly supported by a plurality of horizontally spaced support rollers 52 (see FIG. 22). The support rollers 52 are supported for rotation between parallel, side plates or rails (not shown), which are similar to the plates or rails 50 of the table structure and extend from the opposite side of the bridge 10. These rails also are supported by the boxlike structure.

A motor, which is preferably hydraulic, is disposed within a housing 53 (see FIG. 21) on one of the plates 51 and connected through suitable gearing to one end of a shaft of a drive roller 54 for the endless band 11. The shaft of the drive roller 54 is rotatably journaled in the plates 51.

The shaft of the drive roller 54 is connected to the shaft of a drive roller 55 (see FIG. 22) for the endless band 12 through a chain 56, which meshes with sprockets on the shafts of the drive rollers 54 and 55. The shaft of the drive roller 55 also is rotatably journaled in the plates 51.

Accordingly, rotation of the drive rollers 54 and 55 causes the endless bands 11 and 12 to be driven in unison to move the material 14 in either of the longitudinal directions. Thus, the material 14 may be moved longitudinally relative to the cutting blade 16 through driving the endless bands 11 and 12 in unison.

Each of the bands 11 and 12 passes over a takeup roller 57. Each of the takeup rollers 57 is longitudinally adjustable to provide the desired tightness of the band so that the bands are driven when the drive rollers 54 and 55 rotate.

As shown in FIG. 21, the takeup roller 57 for the band 11 has its shaft rotatably journaled in longitudinal slots in U-shaped brackets 57', which are fixedly secured to the rails 50, which support the support rollers 49. Each end of the shaft of the takeup roller 57 also is rotatably supported in a bearing block 58, which is longitudinally movable in the U-shaped brackets 57'.

When a screw 59, which is threaded into the table structure and secured to the bearing block 58, is turned, the bearing block 58 will move longitudinally. Thus, rotation of the screws 59 on opposite sides of the takeup roller 57 will move the takeup roller 57 to provide the desired tightness of the band 11 or 12.

Figure 17:
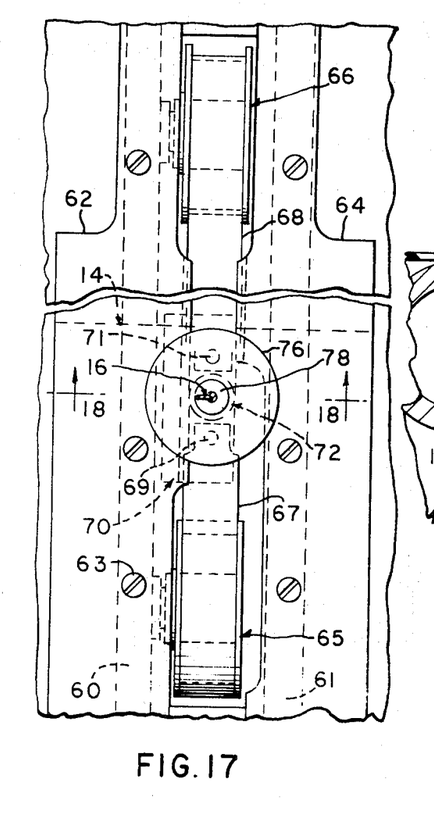
FIG. 17 is a top plan view of a structure for closing the transverse passage between the endless support bands and taken along line 17–17 of FIG. 13.
Figure 18:
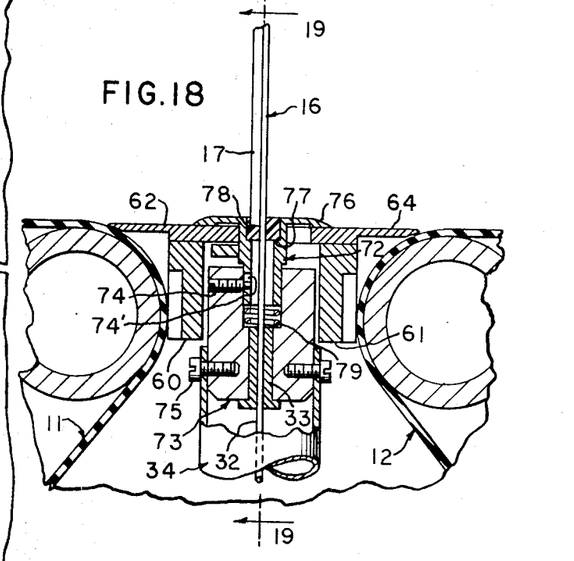
FIG. 18 is a sectional view of the closure structure of FIG. 17 and taken along line 18–18 of FIG. 17.

As shown in FIGS. 17 and 18, a pair of transverse, horizontally disposed beams 60 and 61 extends through the transverse passage 15 between the endless bands 11 and 12. The beams 60 and 61 are supported by the plates 51 of the table structure.

A throat way section 62 is supported on the transverse beam 60 and fixedly attached thereto by suitable means such as screws 63. A throat way section 64 is similarly secured to the transverse beam 61.

Each of the throat way sections 62 and 64 is beveled (see FIG. 18) adjacent the portion of the endless band 11 or 12 with which it cooperates. The top surface of each of the throat way sections 62 and 64 is disposed slightly below the surface of the endless bands 11 and 12 on which the material 14 rides. This difference is approximately 0.015 inch.

The throat way sections 62 and 64 are horizontally spaced from each other to provide a transverse gap therebetween to receive the stiffening rod 32 of the cutting blade 16 therebetween. The transverse gap between the throat way sections 62 and 64 permits the cutting blade 16 to move transversely relative to the entire width of the endless bands 11 and 12. This insures that the cutting blade 16 may traverse the entire width of the material 14, which is supported on the endless bands 11 and 12.

While the throat way sections 62 and 64 reduce the width of the transverse passage 15, which is formed between the endless bands 11 and 12, the small gap between the throat way sections 62 and 64 still may permit the material 14 to enter therein whereby the material could not be longitudinally advanced between the endless bands 11 and 12. Although certain types of material may be capable of moving across the small gap between the throat way sections 62 and 64, other types of material could not be advanced between the endless bands 11 and 12.

One suitable structure for closing this gap between the throat way sections 62 and 64 is shown and described in the copending patent application of Edward C. Bruns for "Gap Closer For Material Cutting Machine," Ser. No. 636,964; now U.S. Pat. No. 3,465,630 filed May 8, 1967, and assigned to the same assignee as the assignee of the present application.

The closure structure of the aforesaid Bruns application permits only a small opening to remain within the gap between the throat way sections 62 and 64 through which the cutting blade 16 may extend. This opening is maintained in vertical alignment with the cutting blade 16 throughout the movement of the cutting blade 16 through the transverse passage 15.

The closure structure includes drums 65 and 66, which are rotatably mounted on the transverse beam 60 of the bridge 10 (see FIG. 17). Each of the drums 65 and 66 is disposed beyond vertical planes passing through the side edges of the endless bands 11 and 12.

A spring tape 67 is wound on the drum 65, and a spring tape 68 is wound on the drum 66. Each of the tapes 67 and 68 is preferably the type of spring tape sold under the trademark Neg'ator by Hunter Spring, a Division of Ametek, Inc. As shown in FIG. 17, the width of each of the spring tapes 67 and 68 completely closes the gap, which is between the throat way sections 62 and 64, in the portion across which the material 14 moves. Therefore, the material 14 cannot move into the gap between the throat way sections 62 and 64.

The spring tape 67 is attached by a pin 69 to a U-shaped retaining member 70, which moves transversely with the cylindrical member 34 while permitting the cylindrical member 34 to rotate relative thereto. The spring tape 68 also is fixedly attached to the retaining member 70 by a pin 71.

The retaining member 70 has a sleeve 72 rotatably journaled therein. The sleeve 72 is disposed within a recess in a support block 73 and attached to the support block 73 by a screw 74 (see FIG. 18) extending into a longitudinal slot 74' in the sleeve 72. The support block 73 is fixed by screws 75 to the upper end of the cylindrical member 34, which is rotatably supported on the lower saddle 35.

Accordingly, when the upper saddle 29 and the lower saddle 35 are moved along the guide rails 30 and 36, respectively, by their actuating structure through the motor 38 rotating the drum 37, the member 70 and the tapes 67 and 68 move therewith. Thus, in FIGS. 17 and 19, the cutting blade 16 is shown adjacent one end of the transverse passage 15 whereby the tape 68 is extended to its maximum length while the tape 67 is wound upon the drum 65. In this position, the blade 16 is disposed beyond the adjacent edge (in phantom in FIG. 17) of the material 14.

If the blade 16 is moved toward the drum 66 from the drum 65, the tape 67 will follow this movement by being pulled off the drum 65 while the tape 68 will be returned onto the drum 66. The resiliency of the tapes 67 and 68 urges each of the tapes 67 and 68 to be wound upon the drums 65 and 66, respectively.

The sleeve 72 has an upper flange 76, which overlies portions of the throat way sections 62 and 64 adjacent to the gap therebetween (see FIG. 17). The sleeve 72 has an annular shoulder 77 formed therein to support an insert 78, which is retained within the sleeve 72 by a press fit. The insert 78, which is formed of a suitable plastic such as Teflon, has a recess therein to receive the connecting edge 20 of the cutting blade 16 and the lower end of the leading edge 17 when the cutting blade 16 is in its lowermost position as shown in FIG. 18. This recess is formed by the blade 16 during reciprocation.

Figure 19:
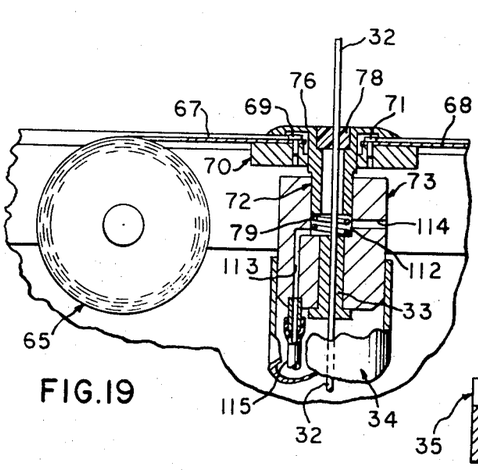
FIG. 19 is a sectional view of the closure structure of FIG. 17 and taken along line 19–19 of FIG. 18.

With the annular flange 76 of the sleeve 72 having an outer diameter sufficient to completely close the gap between the throat way sections 62 and 64 adjacent the cutting blade 16 and the spring tapes 67 and 68 extending beneath the annular flange 76 as shown in FIGS. 17 and 19, the only opening is the small recess within the insert 78 into which the bottom of the cutting blade 16 extends. Therefore, the material 14 is easily moved from the endless band 11 to the endless band 12 and vice versa without either end of the material 14 being disrupted in its movement by the transverse passage 15.

Because the transverse beams 60 and 61 are supported at only their opposite ends and have the throat way sections 62 and 64 supported thereon, this weight may tend to cause some bowing of the throat way sections 62 and 64. In order to compensate for this bowing of the throat way sections 62 and 64, the sleeve 72 is biased downwardly by a spring 79 to urge the annular flange 76 into engagement with the throat way sections 62 and 64 whereby the material 14 will not be caught between the throat way section 62 or 64 and the annular flange 76 if the throat way section 62 or 64 should bow. This longitudinal movement of the sleeve 72 by the spring 79 is permitted through the longitudinal slot 74' permitting relative movement of the sleeve 72 with respect to the support block 78.

Accordingly, if the throat way sections 62 and 64 should not bow, then the top surface of the flange 76 will be disposed above the top surfaces of the endless bands 11 and 12 as shown in FIG. 18. However, the material 14 will follow the contour of its support.

As shown in FIGS. 18 and 19, the annular flange 76 is beveled along its outer surface. This permits easy movement of the material from the throat way section 62 or 64 to the annular flange 76 without the material 14 having its longitudinal movement retarded.

As previously mentioned, the plate 22, which carries the reciprocating motor 19 of the cutting blade 16 thereon, is slidably mounted on the rods 23. The plate 22 and its supporting structure are adapted to be moved from the solid line position of FIG. 13 to the phantom line position through actuation of a cable 80.

Figures 13, 14, 15, 16:
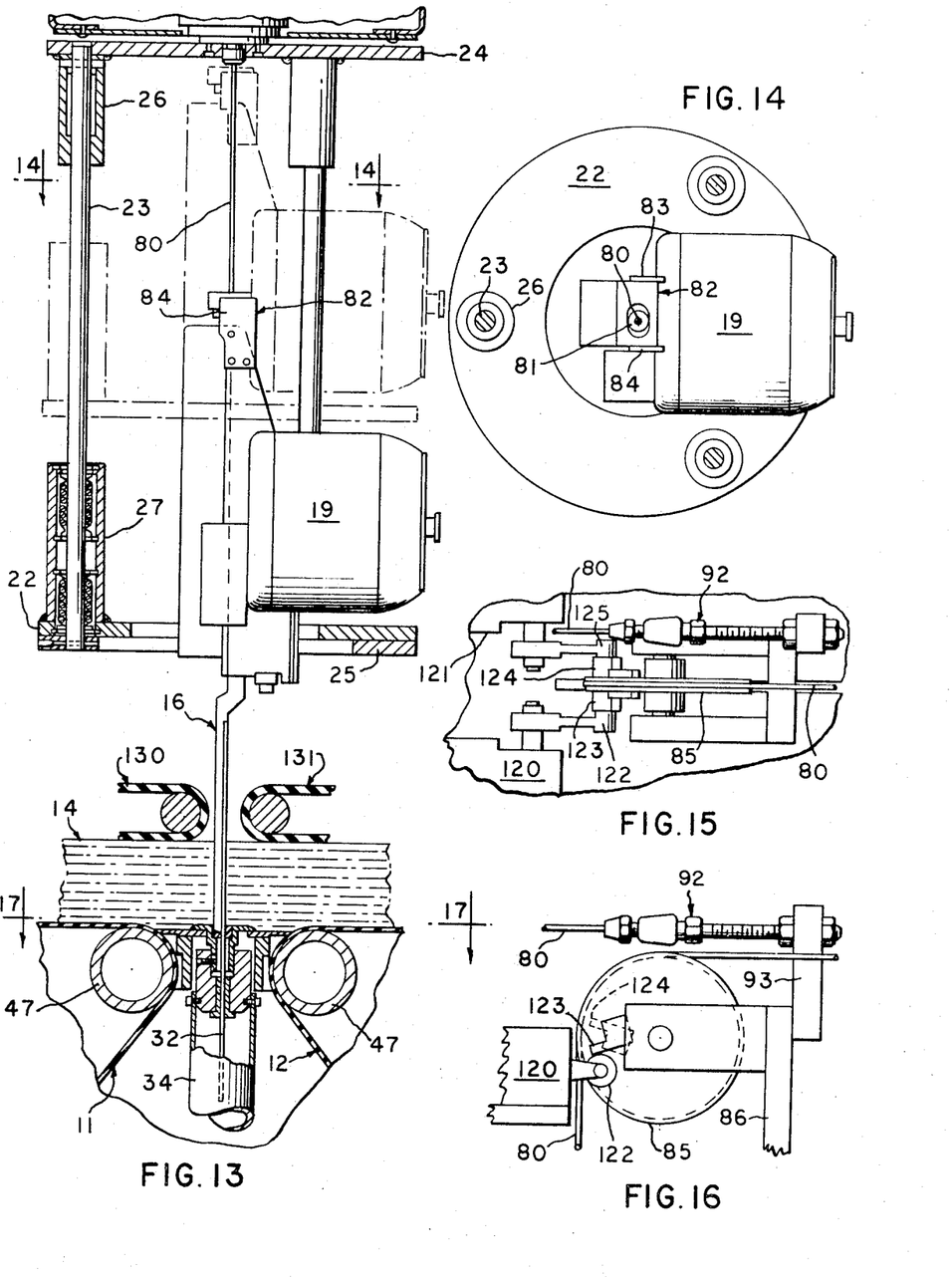
FIG. 13 is a vertical sectional view, partly in elevation, illustrating the relation of various parts of the cutting blade structure and taken along line 13–13 of FIG. 1.
FIG. 14 is a top plan view, partly in section, of the reciprocating motor for the cutting blade and related support structure and taken along line 14–14 of FIG. 13.
FIG. 15 is a top plan view of a portion of the lifting structure for lifting the cutting blade from cutting engagement with the material and taken along line 15–15 of FIG. 10.
FIG. 16 is a side elevational view of the structure of FIG. 15.

As shown in FIG. 14, the cable 80 is attached to a spherical ball 81, which is retained within a U-shaped bracket 82. The bracket 82 has its legs 83 and 84 fixedly attached to the motor 19.

When the cable 80 is pulled upwardly, the plate 22, the motor 19, and the cutting blade 16 are lifted upwardly. As shown in FIG. 11, the cable 80 extends upwardly through the upper plate 24 and through the hollow interior of the shaft 28.

As shown in FIGS. 10 and 16, the cable 80 passes around a pulley 85, which is rotatably mounted on an upstanding support 86 on the upper saddle 29. The cable 80 then extends around a pulley 87, which is rotatably mounted on the bridge 10.

The cable 80 next passes around a pulley 88, which is rotatably mounted on a bifurcated support 89. The bifurcated support 89 is fixedly secured to one end of a piston rod 90 of a hydraulic cylinder 91, which is supported by the bridge 10. The cable 80 is connected through a turnbuckle 92 to an arm 93 of the upstanding support 86 on the upper saddle 29.

During any transverse movement of the cutting blade 16 through the transverse passage or throat 15, there is no movement of the cable 80 to cause any raising or lowering of the cutting blade 16. This is because any shortening of the portion of the cable 80 between the pulley 85 and the pulley 87 due to movement of the upper saddle 29 and the lower saddle 35 by energization of the motor 38 results in the length of the cable 80 between the pulley 88 and the arm 93 extending the same amount and vice versa. Therefore, the cutting blade 16 remains in the position in which it cuts the material 14 during reciprocation of the cutting blade 16.

If it is desired to lift the cutting blade 16 from cutting engagement with the material 14, fluid is supplied to the hydraulic cylinder 91 to retract the piston rod 90. Accordingly, the bifurcated support 89 is moved to the dotted line position of FIG. 10. When this occurs, the distance between the pulleys 87 and 88 is lengthened whereby the plate 22, the motor 19, and the cutting blade 16 are lifted.

In addition to the plate 22, the motor 19, and the cutting blade 16 being adapted to be lifted with respect to the material 14, which is to be cut, the entire cutting blade structure, which also includes the plates 24 and 25 and the rods 23, may be rotated about the axis of the cable 80. The axis of the cable 80 is aligned with the axis of the shaft 28. The axis of the cable 80 is aligned with the stiffening rod 32 of the cutting blade 16 so that the rotation of the cutting blade 16 is about the stiffening rod 32.

Figure 12:
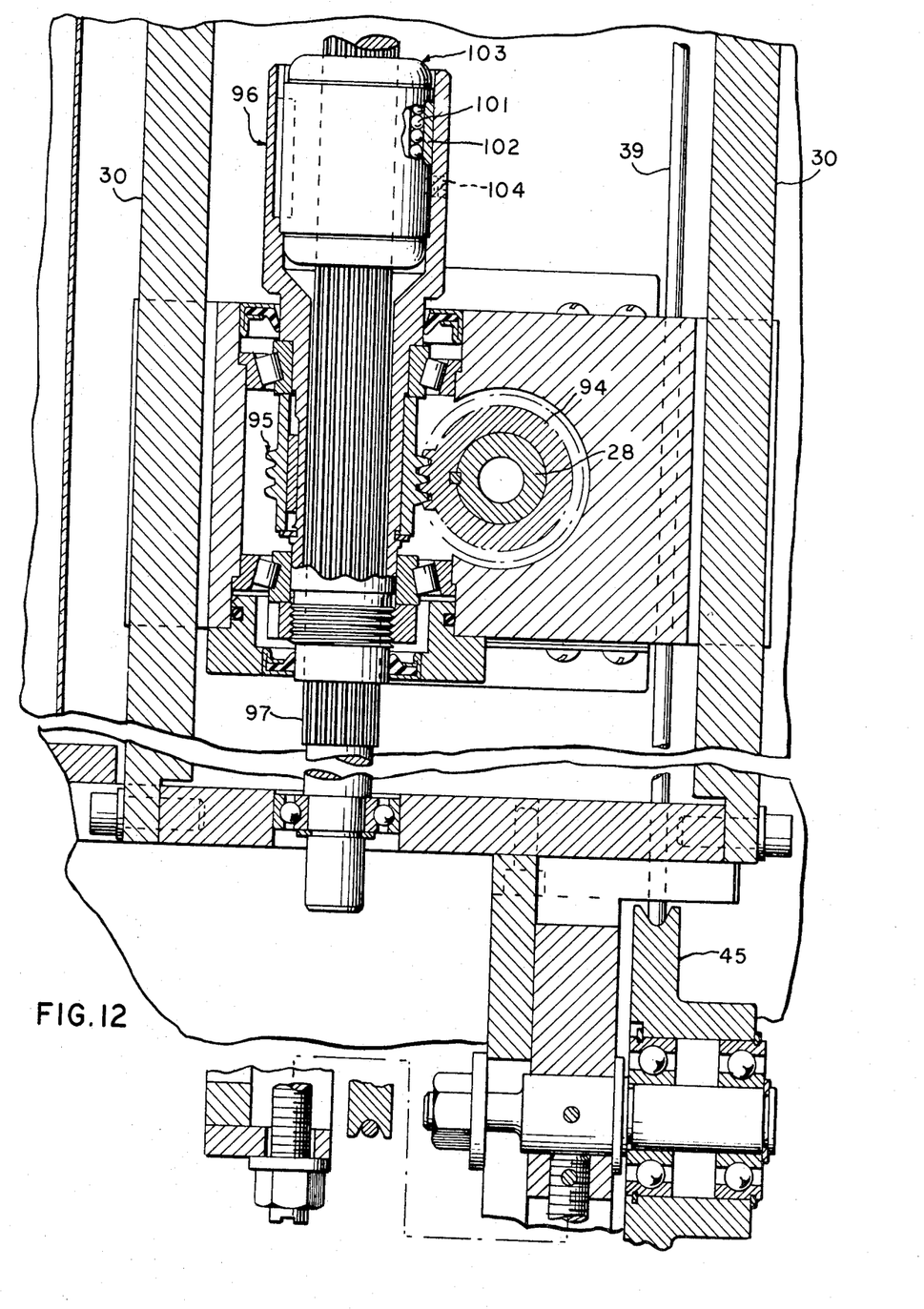
FIG. 12 is a horizontal sectional view of the support structure of FIG. 11 and taken along line 12–12 of FIG. 11.

As shown in FIGS. 11 and 12, the shaft 28 has a helical gear 94 keyed thereto whereby rotation of the helical gear 94 causes rotation of the shaft 28. The helical gear 94 meshes with a helical gear 95, which is keyed to a hollow shaft 96 for rotation therewith.

The shaft 96 is rotatably mounted within the upper saddle 29 but is movable with the upper saddle 29 as the upper saddle 29 is moved along the guide rails 30. The hollow shaft 96 surrounds a spline shaft 97 and slides relative thereto when the upper saddle 29 is moved along the guide rails 30.

The spline shaft 97 is rotated by a reversible motor 98, (see FIG. 10), which is preferably hydraulic. The motor 98 rotates a gear 99, which meshes with a gear 100 on one end of the spline shaft 97.

Rotation of the spline shaft 97 is transmitted to the hollow shaft 96 through bearing balls 101 (see FIG. 12), which ride in passages formed between splines of the spline shaft 97, acting between wall 102 of a housing 103, which is secured by a screw 104 to the hollow shaft 96, and the spline shaft 97. The bearing balls 101 circulate through a return circuit, which is formed within the housing 103, communicating with the passages formed between the splines. The spline shaft 97 and the cooperating housing 103 including the bearing balls 101 is a unit sold by the Saginaw Steering Gear Division of General Motors Corporation.

The reversible motor 98 also drives a lower spline shaft 105, which extends through the lower saddle 35 in the same manner as the spline shaft 97 extends through the upper saddle 29. The lower spline shaft 105 has a gear 106 (see FIG. 10) on its end, which meshes with a gear 107 that is driven by the motor 98. The spline shaft 105 rotates a hollow shaft 108, which is connected to the cylindrical member 34 and is rotatably supported within the lower saddle 35 similar to the rotatable support of the shaft 28 within the upper saddle 29, in the same manner as the shaft 28 is rotated by the spline shaft 97.

Accordingly, when the motor 98 is energized, the plates 22, 24, and 25, the rod 23, the motor 19, the cylindrical member 34, the support block 73, the sleeve 72, and the insert 78 are rotated. Thus, when the cutting blade 16 is rotated, the connecting edge 20 of the cutting blade 16 remains in the desired aligned relation with respect to the receptacle in the insert 78.

Figure 20:
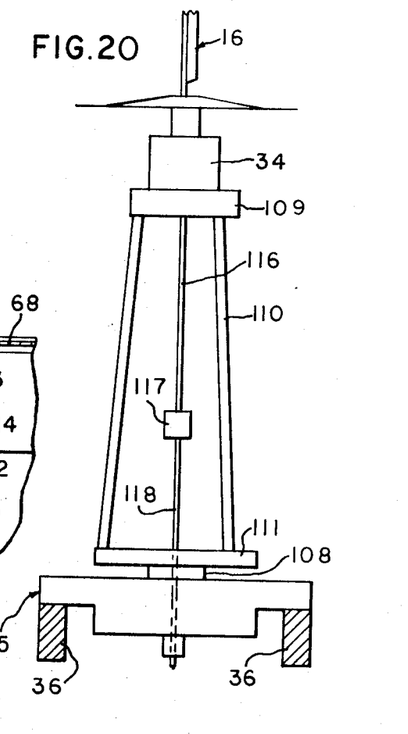
FIG. 20 is a schematic elevational view, partly in section, showing the air supply to the cutting blade support structure.

The connection between the hollow shaft 108 and the cylindrical member 34 whereby the hollow shaft 108 rotates the cylindrical member 34 is shown in FIG. 20. The cylindrical member 34 is fixedly secured to an annular member 109 for rotation therewith. Three rods 110 extend downwardly from the member 109 at an angle thereto to form a tripod mount. The bottom ends of the rods 110 are fixedly secured to an annular member 111, which is secured to the hollow shaft 108 whereby rotation of the hollow shaft 108 rotates the cylindrical member 34.

As previously mentioned, the rod 32 generates heat during reciprocation thereof with the material 14. Because the rod 32 is also moving in sliding engagement with the bushing 33, heat also is generated from this friction. As a result, the rod 32 tends to heat beyond the melting temperature at which some fabrics might tend to fuse. Accordingly, the present invention includes means to cool the stiffening rod 32.

The cooling means preferably comprises introducing air into a receptacle 112 in the support block 73 through which the stiffening rod 32 extends and reciprocates. The support block 73 has an inlet air passage 113 through which air is introduced into the recess or receptacle 112 within the support block 73 and an exhaust passage 114 to permit the air to flow from the support block 73. Thus, the introduction of the air into the recess in the support block 73 cools the stiffening rod 32 so as to reduce the heat of the stiffening rod 32.

A flexible hose 115 connects the air inlet passage 113 with an air conduit 116, which is secured to the annular member 109 for rotation therewith. The conduit 116 is connected through an air swivel coupling 117 to a conduit 118, which passes through the hollow shaft 108 and is not rotatable. The conduit 118, which is secured to the lower saddle 35 for movement therewith, is connected by a flexible hose to a suitable source of air under pressure. It is not necessary that this air be cooled since the pressure of the air and its movement through the support block 73 will reduce the temperature of the reciprocating stiffening rod 32.

If a sharp angle is to be cut in the material 14, the cutting blade 16 must be removed from engagement with the material 14 when the cutting blade 16 rotates. Of course, if a sharp angle is not desired and the angle is small (no greater than 30°) depending upon the material being cut and the total thickness of the material being cut, it is not necessary to remove the cutting blade 16 from engagement with the material 14. For example, if the material were vinyl and a plurality of layers of vinyl were disposed on the endless bands 11 and 12, it might be impossible to rotate the cutting blade 16 more than 5° without damaging the cutting blade 16.

Accordingly, when a sharp angle is to be cut in the material 14, no rotation of the cutting blade 16 can occur until the cutting blade 16 is lifted from cutting engagement with the material 14. Likewise, the cutting blade 16 cannot be returned into cutting engagement with the material 14 until rotation of the cutting blade 16 has ceased.

As shown in FIGS. 15 and 16, a control apparatus is employed to insure that the cutting blade 16 is in its lifted position before any rotation thereof occurs and that the blade 16 has returned to its cutting position before any transverse movement of the blade 16 or longitudinal movement of the bands 11 and 12 for cutting purposes occurs. It should be understood that this control apparatus is not utilized when only small angles are to be cut in the material 14 and rotation of the cutting blade 16 is to occur without the cutting blade 16 being lifted from cutting engagement with the material 14.

This control apparatus includes limit switches 120 and 121, which are mounted on the upper saddle 29. The limit switch 120 has an actuating roller 122, which is disposed in the rotating path of an actuator 123, which is fixed to the pulley 85 for rotation therewith.

When the cutting blade 16 is in cutting engagement with the material 14 as shown in FIG. 13, the actuator 123 engages the actuating roller 122 of the limit switch 120 to close the switch 120. As a result, the cutting blade 16 may be moved transversely, and the bands 11 and 12 may move the material 14 longitudinally to cut the material 14.

When it is desired to lift the cutting blade 16 from cutting engagement with the material 14, the flow of fluid to the cylinder 91 is reversed. As a result, the piston rod 90 is retracted into the cylinder 91 to move the bifurcated support 89 to the phantom line position of FIG. 10.

When the bifurcated support 89 reaches the phantom line position of FIG. 10, a second actuator 124, which is disposed on the opposite side of the pulley 85 from the actuator 123, engages an actuating roller 125 of the limit switch 121 to open the switch 121. This occurs after approximately 300° of rotation of the pulley 85. When the actuating roller 125 of the limit switch 121 is engaged by the actuator 124 of the pulley 85, energization of the motor 98 may occur to rotate the cutting blade support structure.

When the material 14 is a plurality of layers of cloth, for example, engagement of the cutting blade 16 with the layers may result in some slight shifting of the layers of cloth with respect to the cutting blade 16. If this were to occur, then the same pattern would not be produced in all the layers of cloth.

Accordingly, a hold down mechanism may be employed with the cutting machine of the present invention to exert a predetermined or selected force on the material 14 adjacent the cutting blade 16. The force exerted is determined by the type of material, the thickness of the layers of material, and the total thickness of the material disposed on the endless bands 11 and 12.

One suitable type of hold down mechanism is shown and described in the copending patent application of James G. Wiatt and Edward C. Bruns for "Hold Down Structure For Material Cutting Machine," Ser. No. 636,968, filed May 8, 1967, and assigned to the same assignee as the assignee of the present application. The hold down structure of the aforesaid Wiatt et al. application includes a pair of secondary, flexible endless bands or belts 130 and 131 (see FIG. 1), which are disposed in vertically-spaced relation to the endless bands 11 and 12, respectively. As shown in FIG. 1, the secondary endless band 130 is disposed on the same side of the cutting blade 16 as the endless band 11 while the endless band 131 is positioned on the same side of the cutting blade 16 as the endless band 12.

As more particularly shown and described in the aforesaid Wiatt et al. application, the endless bands 130 and 131 are adapted to be driven in unison with the endless bands 11 and 12 so that the velocity of the secondary endless band 130 is the same as the velocity of the endless band 11 and the velocity of the secondary endless band 131 is the same as the velocity of the endless band 12. This insures that the endless bands 130 and 131 do not affect the movement of the material 14 by the endless bands 11 and 12.

The endless bands 130 and 131 are supported by the upright support structure of the bridge 10 as more particularly shown and described in the aforesaid Wiatt et al. application. This support structure has been omitted from FIG. 1 for clarity purposes.

It should be understood that the motor 19 is connected to power through a conductor 132 (see FIG. 11) and a slipping structure 133. Suitable electrical conductors (not shown) extend from the slipring structure 133 through the interior of the hollow shaft 28 to the motor 19. The conductors would be secured to the hollow shaft 28 for rotation therewith whereby there would be no relative rotation between the conductors and the motor 19.

Considering the operation of the present invention, the material 14 is disposed on one of the endless bands 11 and 12 initially. It will be assumed that this is the band 11.

The movement in a longitudinal direction of the material 14 relative to the cutting blade 16 and the transverse movement of the cutting blade 16 relative to the material 14 is controlled by a numerical control apparatus 160. The control apparatus 160 also determines when the cutting blade 16 is lifted from engagement with the material 14 and rotated relative thereto.

The control apparatus 160 produces the desired pattern on the material, which may be a plurality of layers of cloth, for example. The specific pattern is provided as an input to the numerical control apparatus 160. This input controls the output of the control apparatus 160 in a well-known manner to produce the desired movements to cut the desired pattern in the material 14. Thus, the input to the numerical control apparatus 160 is such that when a small angle is to be cut in the material without it being desired that a sharp angle be formed, the numerical control apparatus 160 will cause rotation of the cutting blade 16 without the cutting blade 16 having to be removed from cutting engagement with the material 14.

With the material 14 disposed on the endless band 11, the hydraulic motor, which is disposed within the housing 53 and drives the endless bands 11 and 12 in unison, is energized by the numerical control apparatus 160 to advance the material 14 longitudinally until one end of the material 14 is disposed for cutting engagement by the cutting blade 16. The numerical control apparatus 160 also has positioned the cutting blade 16 at the desired heading and at the desired transverse position in the transverse passage 15. Accordingly, cutting of the material 14 begins.

When it is desired to change the heading of the blade 16 to produce a cut at a sharp angle relative to the prior cut in the material 14, the blade 16 must be lifted from cutting engagement with the material 14 before the heading of the blade 16 is changed by rotating the support structure of the cutting blade 16. Then, it is necessary to return the cutting blade 16 into cutting engagement with the material 14 after rotation of the cutting blade 16 has been completed to provide the new heading for the cutting blade 16. The numerical control apparatus 160 automatically controls all of these movements.

Figure 23:
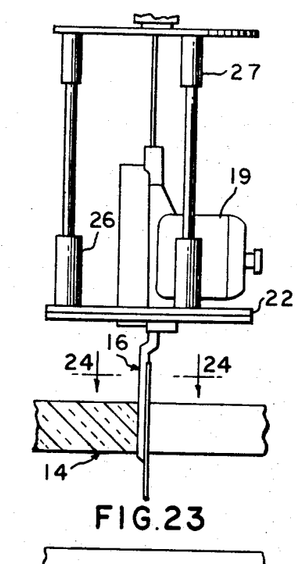
FIG. 23 is a side elevational view, partly in section, showing the cutting blade in cutting engagement with the material and forming a cut in the material.
Figure 24:
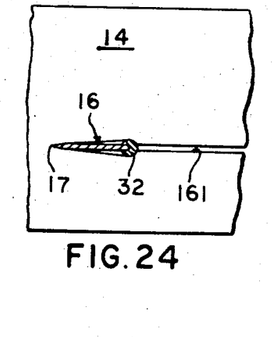
FIG. 24 is a top plan view, partly in section, showing the cutting blade forming a cut in the material and taken along line 24—24 of FIG. 23.

Referring to FIGS. 23 to 32, there are shown the various movements of the cutting blade structure to cut a 90° corner in the material 14. As shown in FIGS. 23 and 24, the cutting blade 16 has created a longitudinal cut 161 in the material 14. The cut 161 is made by moving the material 14 from left to right in FIGS. 23 and 24 while the cutting blade 16 is reciprocate by the motor 19. When the leading edge 17 of the cutting blade 16 has moved relative to the material 14 to point 162 of the longitudinal cut 161 (see FIG. 26) at which it is desired to form a cut 90° to the cut 161, further advancement of the material 14 through driving of the endless bands 11 and 12 in unison is stopped by the numerical control apparatus 160.

Figure 25:
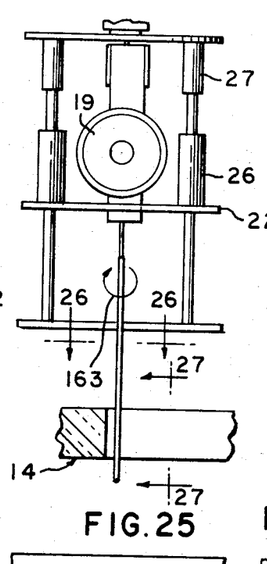
FIG. 25 is a view, similar to FIG. 23, but showing the cutting blade removed from cutting engagement with the material and rotated 90° from the position of FIGS. 23 and 24.

The hydraulic cylinder 91 (see FIG. 10) is then actuated to move the bifurcated support 89 to the phantom line position of FIG. 10. This removes the cutting blade 16 from cutting engagement with the material 14 as shown in FIG. 25. During this lifting of the cutting blade 16, the motor 19 continues to reciprocate the cutting blade 16.

After the cutting blade 16 has been raised to its uppermost position as indicated by the actuating roller 125 of the limit switch 121 being engaged by the actuator 124 on the pulley 85, the numerical control apparatus 160 then energizes the motor 98 whereby rotation of the cutting blade structure occurs to rotate the cutting blade 16 to change the heading of the cutting blade 16.

Accordingly, when it is desired to cut a 90° corner relative to the longitudinal cut 161, the cutting blade structure is rotated 90° to position the cutting blade 16 at the new heading. In this example, the cutting blade 16 will be rotated clockwise (as viewed in FIGS. 24 and 28) from the position of FIG. 24 to the position of FIG. 26. This is indicated by arrow 163 in FIG. 25.

Figure 26:
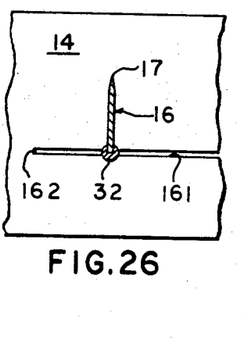
FIG. 26 is a view, similar to FIG. 24, but taken along line 26—26 of FIG. 25.
Figure 27:
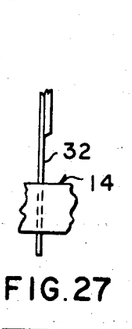
FIG. 27 is an end elevational view showing the relation of the cutting blade to the material and taken along line 27—27 of FIG. 25.

When this rotation occurs, the cutting blade 16 is positioned as shown in FIG. 26 wherein its cutting surfaces (the leading edge 17 and the connecting edge 20) are no longer disposed at the end 162 of the cut 161 but longitudinally spaced therefrom. Rotation of the cutting blade 16 occurs about the axis of the cable 80, which is aligned with the longitudinal axis of the stiffening rod 32 of the cutting blade 16.

When the numerical control apparatus 160 senses that the cutting blade 16 is in the position of FIG. 26, the numerical control apparatus 160 causes the endless bands 11 and 12 to be driven in unison to advance the material 14 from left to right (as viewed in FIGS. 26 and 28) until the connecting edge 20 of the cutting blade 16 is disposed above the point 162 of the cut 161.

Figure 28:
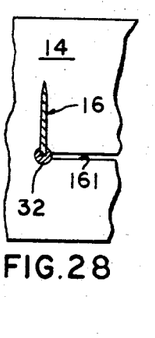
FIG. 28 is a view, similar to FIG. 26, but showing the cutting blade advanced to the end of the cut in the material.
Figure 29:
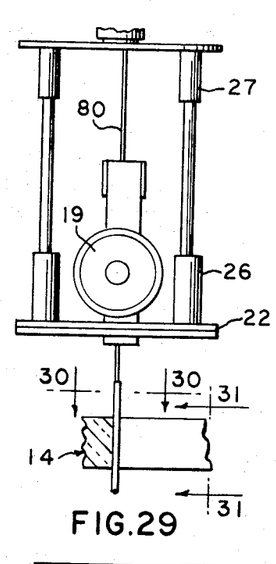
FIG. 29 is a view, similar to FIG. 23, in which the cutting blade is in cutting engagement with the material but rotated 90° from the position of FIG. 23.
Figure 30:
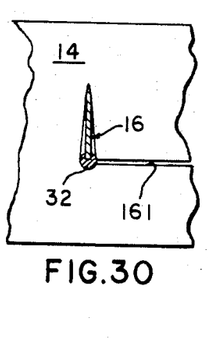
FIG. 30 is a view, similar to FIG. 28, but showing the cutting blade in cutting engagement with the material and taken along line 30—30 of FIG. 29.
Figure 31:
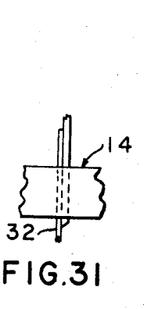
FIG. 31 is an end elevational view of a portion of the cutting blade and the material of FIG. 29 and taken along line 31—31 of FIG. 29.

When the numerical control apparatus 160 senses that the cutting blade 16 is in the position of FIG. 28, the hydraulic cylinder 90 is actuated to return the bifurcated support 89 to the solid line position of FIG. 10. This lowers the cutting blade 16 to return it into cutting engagement with the material 14.

Because the connecting edge 20 of the cutting blade 16 is sharpened, cutting of the material 14 occurs as soon as the connecting edge 20 engages the material 14. When the cutting blade 16 has returned to its lowermost position wherein the connecting edge 20 is disposed just above the recess in the insert 78, the limit switch 120 has its actuating roller 122 engaged by the actuator 123 on the pulley 85. This signal to the numerical control apparatus 160 allows the numerical control apparatus 160 to advance the cutting blade 16 relative to the material 14.

Figure 32:
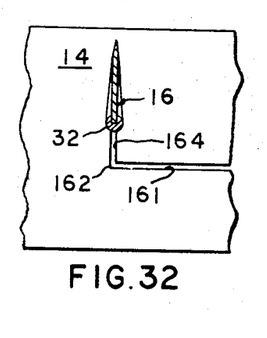
FIG. 32 is a view, similar to FIG. 30, but showing the cutting blade advanced from the position of FIG. 30.

As a result, the numerical control apparatus 160 energizes the motor 38 to cause transverse movement of the cutting blade 16 through the transverse passage 15 by moving the upper saddle 29 and the lower saddle 35 in sliding relation along the transverse guide rails 30 and 36, respectively. As shown in FIG. 32, this causes the cutting blade 16 to produce a transverse cut 164, which is disposed perpendicular to the longitudinal cut 161 whereby a 90° corner is cut in the material.

When the cutting blade 16 is lifted out of engagement with the material 14, the stiffening rod 32 is still disposed within the bushing 33 because of the length of the stiffening rod 32. Therefore, the stiffening rod 32 serves as a guide to insure that the cutting blade 16 remains in the reciprocating plane both during lifting of the cutting blade 16 out of engagement with the material 14 and when the cutting blade 16 is in cutting engagement with the material 14. The rod 32 also insures that the cutting blade 16 always returns to the desired position after the cutting blade 16 has been lifted and returned into engagement with the material 14.

While the foregoing description of the cutting machine of the present invention has described cutting a sharp corner of 90° in the material 14, it should be understood that the cutting blade 16 may cut circles in the material 14 or form any angle relative to the previous cut in the material 14. When cutting a circle, the blade 16 has the leading edge 17 disposed tangent to the circle being formed. This insures that a true circle is cut in the material 14.

As previously mentioned, it is not always necessary to lift the cutting blade 16 from engagement with the material 14 to form a cut at an angle relative to the previous cut. For example, if it is desired to change the heading of the cutting blade 16 only 5°, this may be accomplished by merely rotating the cutting blade structure without lifting the cutting blade 16 from cutting engagement with the material 14. At this small angle, the slight curvature between the two cuts in the material 14 would be so small that it could not be readily distinguished from a sharp angle cut, which is produced when the cutting blade 16 is lifted from cutting engagement with the material 14 before the heading of the cutting blade 16 is changed.

Furthermore, in certain lightweight materials, the heading of the cutting blade 16 could be changed substantially without having to remove it from cutting engagement with the material 14. Of course, this would be utilized only where a sharp corner is not desired but a curved corner is permissible, and the waste of material is immaterial.

As previously mentioned, the numerical control apparatus 160 has the desired pattern programmed therein as an input. This input determines whether rotation of the cutting blade 16 may occur without the cutting blade 16 being lifted from cutting engagement with the material 14. The type of material, the thickness of each layer of material, and the total thickness of the material as well as the desired configuration to be cut in the material determines whether the cutting blade 16 must be lifted from the material 14 before it is rotated. If the material 14 is relatively heavy, any slight rotation of the cutting blade 16 may damage the cutting blade 16.

Referring to FIG. 5, there is shown a cutting blade 170, which is similar to the cutting blade 16. However, the cutting blade 170 has its leading edge 171 formed in the shape of a sawtooth. The sawtooth is sharpened along both sides of each sawtooth so that the leading edge 171 of the cutting blade 170 has a continuous cutting surface.

Referring to FIG. 6, there is shown a cutting blade 172, which is similar to the cutting blade 16. The cutting blade 172 has its leading edge 173 formed as a wavy edge. The leading edge 173 of the cutting blade 172 has its wavy edge sharpened along its entire surface so that the leading edge 173 of the cutting blade 172 presents a continuous cutting surface.

When the material 14 is quite heavy, it may have a tendency to cause turning of any of the cutting blades 16, 170, and 172 during cutting of the material. Referring to FIG. 9, there is shown a cutting blade 174, which will not be turned by the heavy fabric.

The cutting blade 174 has its leading edge 175 notched with projections 176 projecting outwardly at spaced longitudinal portions of the leading edge 175. Each of the projections 176 is sharpened along all of its projecting surfaces. That is, surfaces 177, 178, and 179 of each of the projections 176 are all sharpened. Thus, the material 14 is cut by the surfaces 178 and 179 during upward movement of the cutting blade 174 and by the surfaces 177 and 178 during downward movement of the cutting blade 174. The leading edge 175 has its notched surfaces 180 dull.

As previously mentioned, certain types of synthetic fabrics have relatively low melting temperatures at which they tend to fuse. While the cooling of the stiffening rod 32 through supplying air to the support block 73 is satisfactory to reduce the temperature of the stiffening rod 32 so that its temperature will normally not cause the synthetic fabric to fuse, there is the possibility that some synthetic fabrics might fuse.

Accordingly, as shown in FIGS. 7 and 8, a tubular member 185, which has a longitudinal slot formed therein to receive the cutting blade 16, is adapted to be disposed around the stiffening rod 32 in spaced relation thereto to form a passage 186 therebetween. The lower end of the tubular member 185 is disposed within the insert 78 and is supported on a shoulder 187 (see FIG. 7) formed within the insert 78. The upper end of the tubular member 185 is secured through a bracket 188 to the plate 25.

Thus, the tubular member 185 does not reciprocate when the cutting blade 16 reciprocates whereby there is no friction between the stiffening rod 32 and the material 14 since the stiffening rod 32 does not engage the material 14 to cause an increase in temperature thereto. As shown in FIG. 8, the tubular member 185 keeps the material 14 from engaging not only the stiffening rod 32 but also the sides of the cutting blade 16.

As previously mentioned, air is introduced into the receptacle within the support block 73 by the inlet passage 113 in the support block 73 for cooling the stiffening rod 32 when the tubular member 185 is not utilized. This same structural arrangement may be employed with the tubular member 185 except that the outlet passage 114 could be closed. In this arrangement, a very small passage would be provided between the stiffening rod 32 and the insert 78 until the lower end of the tubular member 185 communicates therewith. Thus, air could flow from the receptacle 112 within the support block 73 through the small passage between the stiffening rod 32 and the insert 78 and into the passage 186 between the stiffening rod 32 and the tubular member 185 to cool the cutting blade 16.

Accordingly, in addition to preventing friction between the stiffening rod 32 and the material 14 being cut to reduce the cutting temperature, the introduction of air into the passage 186 also aids in reducing the cutting temperature. While the tubular member 185 has been shown utilized with the cutting blade 16, it should be understood that it may be employed with any of the other cutting blades 170, 172, and 174.

While the cutting machine of the present invention has been described as having the movable endless bands 11 and 12 move the material 14 longitudinally relative to the cutting blade 16, it should be understood that the endless bands 11 and 12 could be replaced by a support table in which a single flexible band does not move but has the transverse passage 15 therein move. One suitable example of this type of support table is shown and described in U.S. Pat. No. 3,262,348 to Wiatt et al. In this type of arrangement, the bridge 10 would have to be movable in a longitudinal direction to move the cutting blade 16 longitudinally relative to the material 14. Since the endless bands 130 and 131 are secured to the bridge 10, they would be movable therewith. Likewise, the closure structure, which closes the transverse passage 15, also would have to be supported by the movable bridge 10 rather than the side plates of the table structure.

It also should be understood that the endless bands 11 and 12 or the support table of the aforesaid Wiatt et al. patent could be moved transversely relative to the cutting blade 16 rather than moving the cutting blade 16. It is only necessary for the material 14 and the cutting blade 16 to have both relative transverse and longitudinal movement between the material 14 and the cutting blade 16 to produce the desired results of the cutting machine of the present invention.

While the cutting blade reciprocating structure has been shown as disposed above the material 14, it should be understood that this structure could be disposed beneath the endless bands 11 and 12 with the cutting blade 16 reversed. It is only necessary that the cutting blade 16 be reciprocated and be capable of being rotated.

The material 14 has been shown and described as a plurality of similar layers of the same material. However, it should be understood that the material 14 could comprise layers of different materials with the layers having the same or different thicknesses or layers of the same material of different thicknesses.

An advantage of this invention is that there is no waste of the material, which is being cut, when it is desired to form sharp angles such as 90° for example, between cuts in the material. Another advantage of this invention is that it permits sharp angles to be cut in the material while using a cutting blade having a relatively long life. A further advantage of this invention is that it permits cutting of materials that fuse at relatively low melting temperatures.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A method for cutting a pattern in material with a reciprocating single cutting blade having a cutting surface on both its leading edge and an edge connecting the ends of its leading and trailing edges remote from its reciprocating means with the cutting surfaces penetrating the entire thickness of material whenever the single cutting blade is in cutting engagement with the material comprising:

positioning the material in a plane substantially perpendicular to the reciprocating plane of the single cutting blade;

continuously reciprocating the single cutting blade;

producing relative movement in a transverse direction between the single cutting blade and the material to enable the single cutting blade to cut any portion of the entire width of the material;

producing relative movement in a longitudinal direction between the single cutting blade and the material to enable the single cutting blade to cut any portion of the entire length of the material;

producing relative movements in the transverse and longitudinal directions singly or simultaneously together at times with the single cutting blade in cutting engagement with the material to cause cutting of the material to form the pattern in the material;

removing the single cutting blade from cutting engagement with the material whenever the pattern requires an angle relation between a previous cut in the material and a new cut in the material that cannot be obtained by rotating the single cutting blade while the single cutting blade is in cutting engagement with the material;

rotating the single cutting blade when the single cutting blade is removed from cutting engagement with the material to position its leading edge at the desired angle of the new cut relative to the previous cut in the material when a sharp angle is to be cut;

moving the single cutting blade relative to the previous cut in the material when the single cutting blade is removed from cutting engagement with the material to dispose the single cutting blade so that the cutting surface of its connecting edge will form a continuation of the cut in the material; and returning the single cutting blade into cutting engagement with the material to cause the connecting edge of the cutting surface to penetrate the entire thickness of the material being cut.

2. The method according to claim 1 including:

advancing the material to be cut in the longitudinal direction to produce the relative movement in the longitudinal direction;

advancing the single cutting blade in the transverse direction to produce the relative movement in the transverse direction; and coordinating the movements of the material and the single cutting blade.

3. A method for cutting a pattern in material with a single cutting blade having a cutting surface movable into and out of cutting engagement with the material with the cutting surface of the single cutting blade penetrating the entire thickness of the material when the single cutting blade is in cutting engagement with the material comprising:

producing relative movement in a transverse direction between the single cutting blade and the material to enable the single cutting blade to cut any portion of the entire width of the material;

producing relative movement in a longitudinal direction between the single cutting blade and the material to enable the single cutting blade to cut any portion of the entire length of the material;

producing relative movements in the transverse and longitudinal directions singly or simultaneously together at times with the single cutting blade in cutting engagement with the material to cause cutting of the pattern in the material;

removing the single cutting blade from cutting engagement with the material whenever the pattern requires an angle relation between a previous cut in the material and a new cut in the material that cannot be obtained by rotating the single cutting blade while the single cutting blade is in cutting engagement with the material;

rotating the single cutting blade when the single cutting blade is removed from cutting engagement with the material to position its cutting surface at the desired angle of the new cut relative to the previous cut in the material;

moving the single cutting blade relative to the previous cut in the material when the single cutting blade is removed from cutting engagement with the material to dispose the single cutting blade so that its cutting surface will form a continuation of the cut in the material when the single cutting blade is returned into cutting engagement with the material; and returning the single cutting blade into cutting engagement with the material to cause the cutting surface of the single cutting blade to penetrate the entire thickness of the material.

4. The method according to claim 1 in which the single cutting blade is rotatable to any angle through 360° to position its cutting surface at the desired angle of the new cut relative to the previous cut in the material.

5. The method according to claim 1 including rotating the single cutting blade from the position of its previous cut to its new cut directly from the previous cut so that the minimum amount of rotation of the single cutting blade occurs.

6. The method according to claim 1 including also supporting the single cutting blade on the side of the material opposite to the side of the material into which the single cutting blade is moved into and out of engagement with the material at least when the single cutting blade is in cutting engagement with the material to maintain the single cutting blade in its reciprocating plane.

7. The method according to claim 3 in which the single cutting blade is rotatable to any angle through 360° to position its cutting surface at the desired angle of the new cut relative to the previous cut in the material.

8. The method according to claim 3 including rotating the single cutting blade from the position of its previous cut to the position of its new cut directly from the previous cut so that the minimum amount of rotation of the single cutting blade occurs.

9. The method according to claim 3 including also supporting the single cutting blade on the side of the material opposite to the side of the material into which the single cutting blade is moved into and out of engagement with the material at least when the single cutting blade is in cutting engagement with the material.

UNITED STATES PATENT OFFICE
CERTIFICATE OF CORRECTION

Patent No. 3,573,859            Dated April 6, 1971

Inventor(s) George W. Sederberg

It is certified that error appears in the above-identified patent and that said Letters Patent are hereby corrected as shown below:

Column 2, line 66, after "view" insert -- of a portion --. Column 6, line 32, the "semi-colon (;)" should read a -- comma --; lines 32 and 33, cancel "now U.S. Pat. No. 3,465,630"; lin 33, before "and" insert -- now U. S. Pat. No. 3,465,630, --. Column 7, line 43, "78" should read -- 73 --. Column 8, line 29, after "80" insert -- also --; line 43, "98," should read -- 98 --. Column 10, line 60, "slipping" should read -- slip ring --; line 62, "slipring" should read -- slip ring --. Column 11, line 41, "reciprocate" should read -- reciprocated Signed and sealed this 30th day of November 1971.

(SEAL)
Attest:

EDWARD M. FLETCHER, JR.        ROBERT GOTTSCHALK
Attesting Officer                Acting Commissioner of Patents